US012591836B2

(12) United States Patent
Conway et al.

(10) Patent No.: US 12,591,836 B2
(45) Date of Patent: Mar. 31, 2026

(54) COMPUTER-IMPLEMENTED METHOD AND SYSTEM FOR TESTING A MODEL

(71) Applicant: MASTERCARD INTERNATIONAL INCORPORATED, Purchase, NY (US)

(72) Inventors: James Conway, Dublin (IE); Quentin Bragard, Dublin (IE)

(73) Assignee: MASTERCARD INTERNATIONAL INCORPORATED, New York, NY (US)

( * ) Notice: Subject to any disclaimer, the term of this patent is extended or adjusted under 35 U.S.C. 154(b) by 311 days.

(21) Appl. No.: 18/042,968

(22) PCT Filed: Jul. 15, 2021

(86) PCT No.: PCT/US2021/041874
§ 371 (c)(1),
(2) Date: Feb. 24, 2023

(87) PCT Pub. No.: WO2022/046312
PCT Pub. Date: Mar. 3, 2022

(65) Prior Publication Data
US 2023/0325757 A1    Oct. 12, 2023

(30) Foreign Application Priority Data

Aug. 27, 2020    (GB) ..................................... 2013421

(51) Int. Cl.
  *G06Q 10/067*    (2023.01)
  *G06Q 20/20*    (2012.01)
(52) U.S. Cl.
  CPC ......... *G06Q 10/067* (2013.01); *G06Q 20/202* (2013.01)

(58) Field of Classification Search
  CPC .. G06Q 10/067; G06Q 10/063; G06Q 20/202; G06Q 20/102; G06Q 20/20; G06Q 30/0609; G06N 20/00; G06F 17/18
  (Continued)

(56) References Cited

U.S. PATENT DOCUMENTS

| | | | |
|---|---|---|---|
| 10,462,172 B1 | 10/2019 | Sadaghiani et al. | |
| 2017/0109657 A1* | 4/2017 | Marcu .................... | G06N 5/047 |
| 2019/0340518 A1* | 11/2019 | Merrill ................... | G06N 20/20 |

FOREIGN PATENT DOCUMENTS

CN          108090678 A       5/2018

OTHER PUBLICATIONS

Azhar, Annus et al. The Effects of Agglomeration on Socio-economic Outcomes: A District Level Panel Study of Punjab. Scholarly Journal. Pakistan Development Review; Islamabad vol. 58, Iss. 2, (2019): 159-176. (Year: 2019).*

(Continued)

*Primary Examiner* — Fawaad Haider
(74) *Attorney, Agent, or Firm* — Jordan IP Law, LLC

(57)          ABSTRACT

A computer-implemented method for testing a model indicating a parametric relationship between a plurality of channels of multivariate data, the method comprising: obtaining a real dataset of observed multivariate data comprising the plurality of channels; generating a control dataset of multivariate data comprising the plurality of channels, the control dataset being generated based on the model; for each of a plurality of sample subsets from the real dataset and the control dataset, calculating a p-value for the model; and determining whether (1) a distribution difference characteristic of a distribution of the obtained p-values for sample subsets of the real dataset and a distribution of the obtained p-values for sample subsets of the control dataset falls (Continued)

within a second predetermined significance range, and, if condition (1) is met, determining that the model is accurate.

12 Claims, 7 Drawing Sheets

(58) Field of Classification Search
USPC .......................................................... 705/21
See application file for complete search history.

(56) References Cited

OTHER PUBLICATIONS

Bruzzone, A.G. et al. Renovating Intelligent Operations in Supermarket Chains. 2009 Third Asia International Conference on Modelling and Simulation, 2009. (Year: 2009).*

* cited by examiner

301 — Processor
302 — Memory
303 — Network interface
304 — Local I/O interface
105

401 — Model Generator
402 — Model Store
403 — Control Dataset Generator
405 — Model Accuracy Determiner
105
404 — P-Value Calculator
406 — Prediction Generator
407 — Network resource controller

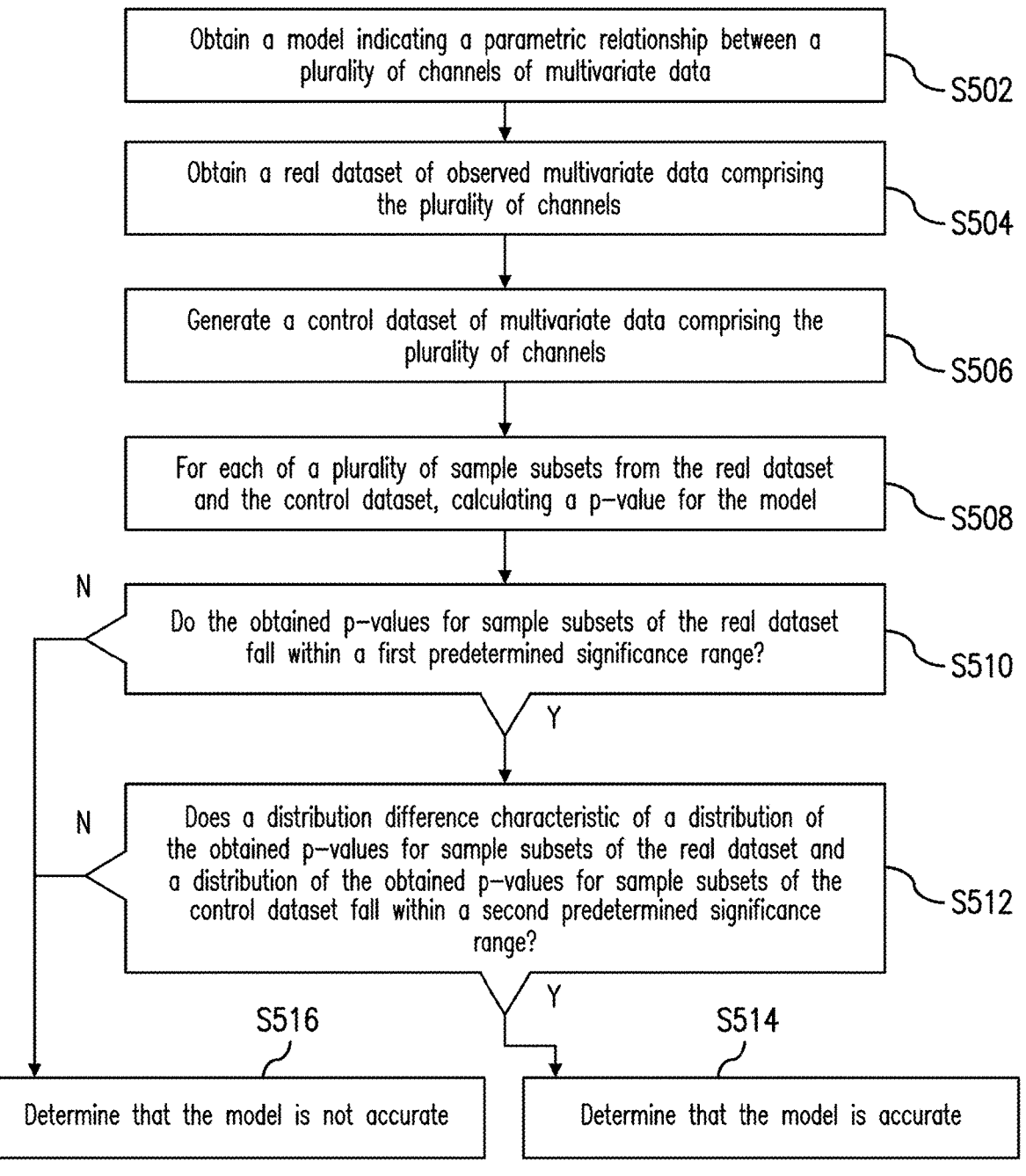

Obtain a model indicating a parametric relationship between a plurality of channels of multivariate data — S502

Obtain a real dataset of observed multivariate data comprising the plurality of channels — S504

Generate a control dataset of multivariate data comprising the plurality of channels — S506

For each of a plurality of sample subsets from the real dataset and the control dataset, calculating a p-value for the model — S508

N

Do the obtained p-values for sample subsets of the real dataset fall within a first predetermined significance range? — S510

Y

N

Does a distribution difference characteristic of a distribution of the obtained p-values for sample subsets of the real dataset and a distribution of the obtained p-values for sample subsets of the control dataset fall within a second predetermined significance range? — S512

Y

S516

Determine that the model is not accurate

S514

Determine that the model is accurate

Fig. 5

Receive request for prediction about a Point of Sale (POS) — S702

Obtain tested model — S704

Apply tested model to the POS to generate a prediction — S706

Transmit prediction — S708

Obtain tested model — S802

Predict a network resource requirement for at least on POS using the tested model — S804

Allocate a network resource based on the prediction — S806

COMPUTER-IMPLEMENTED METHOD AND SYSTEM FOR TESTING A MODEL

CROSS-REFERENCE TO RELATED APPLICATIONS

The present application claims priority to International Patent Application No. PCT/US2021/041874 (filed on Jul. 15, 2021), which claims priority to GB Application No. 2013421.9 (filed Aug. 27, 2020), all of which is hereby incorporated by reference in its entirety.

TECHNICAL FIELD

The present invention relates to analysis of data sets to determine underlying models. The analysis is particularly applicable to computer-implemented financial transactions and network management.

BACKGROUND

Statistical analysis is necessary for the viability of many types of technology dealing with large quantities of data. For example, in brain scanning, it is necessary to model at least 100,000 three-dimensional points to provide useful resolution for modelling blood flow. Solving a 100,000×100,000 matrix of possible interactions within the complex structure of a brain by deterministic calculation based on time-varying data is not typically possible, even after such fine data has been obtained by instruments, so it is necessary to produce and test hypothetical models for an underlying statistical behaviour to explain the observed data, in order to make meaningful inferences about a condition of the scanned brain.

In statistical analysis, a p-value is a probability that a data observation would be obtained for a given underlying statistical distribution of data. For example, when flipping a fair coin, the underlying statistical distribution is a binomial distribution with a probability per flip of 50% heads, and the p-value for a data observation of five heads from five flips is 3.13%.

In hypothesis testing, p-values are compared to a confidence interval (a range of p-values) which is considered extreme enough to show that the underlying statistical distribution has been correctly or incorrectly identified. For example, in the above fair coin example, a confidence interval of <5% may be set, and the data observation of five heads from five flips (with p-value 3.13%) is taken to indicate that the assumption of a fair coin is incorrect.

However, in many cases, an inference based on a confidence interval has a chance of being false. For example it is technically possible, though very unlikely, for a fair coin to give an infinite series of heads outcomes, and therefore assuming that a coin is unfair based on five heads from five flips is a matter of statistical confidence rather than deterministic certainty.

When hypothesis testing is applied to statistical analysis relying on combinations of multiple hypothesis tests (such as samples from a large data set), this problem becomes more extreme, in what is known as the "multiple comparisons problem". Put simply, the more tests you do, the more likely that at least one of the tests leads to a false inference of a statistically significant result, and the less confidence you can have in any final conclusion from the analysis.

FIG. 1A illustrates the multiple comparisons problem with a scenario where random two-valued (x,y) pairs were generated, in sets of 1000, and for each set a p-value probability was calculated that the set would be generated randomly. This was repeated for 10000 sets to give a range of sets from those which do not look random (e.g. a set which coincidentally looks like there is a linear relationship between y and x values) to those which look evenly distributed across x and y values. The sets which do not look random would correspond to low p-values and the sets which are evenly distributed would give higher p-values.

In order to be useful, hypothesis testing relies on the assumption that a p-value falling within a confidence interval is indicative of some statistical inference. However, as can be seen in FIG. 1A, when you calculate a series of p-values for different samples, it becomes increasingly likely that one of the p-values will fall within the confidence interval. In particular, for FIG. 1A with a confidence interval of <5%, 5% of the p-values (500 p-values) fall within the confidence interval as evidence that the distribution is not random (i.e. 5% of the tested samples appear to be non-random), and a confidence interval of 5% is not meaningful in this context of multiple comparisons (multiple p-values).

Some techniques for addressing the multiple comparisons problem have previously been identified. In the Bonferroni correction, the size of the confidence interval for each test is reduced by a factor of the number of tests which are to be performed. In the example of FIG. 1A, 10000 p-values are calculated, so the Bonferroni correction is a factor of 10000, and a confidence interval of <0.0005% is used. This significantly reduces the chance of falsely rejecting the real underlying distribution (a Type I error) and, if any of the 10000 p-values do fall below 0.0005% this may legitimately be taken as evidence that the underlying distribution is not random (i.e. not as hypothesised for the p-value calculations).

However, while the Bonferroni correction is effective against Type I errors (falsely rejecting a correct statistical hypothesis), the Bonferroni correction can cause Type II errors (falsely supporting an incorrect statistical hypothesis). This is illustrated with FIG. 1B.

FIG. 1B has a similar setup to FIG. 1A, but in this case, the two-value pairs are partly correlated as $y=5x+3+R$, where R is a random value between 0 and 100 for each pair. FIG. 1B illustrates 10000 p-values calculated for samples of 1000 (x,y) pairs based on the hypothesis of a random distribution of x and y values and, as expected given that the hypothesis is incorrect, the p-value distribution is skewed towards low probabilities.

Despite the skew towards low probabilities, a Bonferroni correction in this case sets the threshold for statistical significance so low (at 0.00005%) that none of the p-values fall within the confidence interval to indicate that the hypothesis of a random distribution is incorrect, and thus the outcome of the statistical analysis is to support an incorrect hypothesis (a Type II error).

Accordingly, it would be desirable to provide a statistical procedure for dealing with large quantities of data while reducing Type I errors (incorrectly rejecting a true hypothesis) and Type II errors (incorrectly supporting a false hypothesis) when identifying an underlying model for the data.

SUMMARY

According to a first aspect, the present disclosure provides a computer-implemented method for testing a model indicating a parametric relationship between a plurality of channels of multivariate data, the method comprising: obtaining a real dataset of observed multivariate data comprising the plurality of channels; generating a control dataset of multivariate data comprising the plurality of channels, the control dataset being generated based on the model; for each of a plurality of sample subsets from the real dataset and the control dataset, calculating a p-value for the model; and determining whether: (1) a distribution difference characteristic of a distribution of the obtained p-values for sample subsets of the real dataset and a distribution of the obtained p-values for sample subsets of the control dataset falls within a first predetermined significance range, and, if condition (1) is met, determining that the model is accurate.

The above method uses a single statistical test to evaluate accuracy of a model with reduced likelihood of false negatives (Type I errors). Additionally, the above statistical test leads to fewer Type II errors than a corresponding Bonferroni correction-based test. More specifically, the Bonferroni-correction-based test uses a single p-value as a threshold, meaning that, for a fixed threshold, the number of Type I errors and Type II errors changes with, for example, a variance or skew of a p-value distribution of the model used in the test. In order to correct for this, the confidence must be changed for each model, making any comparison of models difficult to interpret. On the other hand, the claimed method looks at a difference between distributions of p-values, so a change in the distribution of the p-values affects p-values for both of the control and real datasets.

Optionally, the multivariate data are transactions in a payment authorisation network comprising a plurality of points of sale, POS, the plurality of channels for each transaction includes a state of the POS at which the transaction occurred, and the model indicates a parametric relationship between the state of the POS and one or more other channels of the plurality of channels.

By applying the method to transactions in a network of points of sale, transactions in the network can be modelled with increased confidence and accuracy.

Optionally, determining whether condition (1), the distribution difference characteristic of the distribution of the obtained p-values for sample subsets of the real dataset and the distribution of the obtained p-values for sample subsets of the control dataset falls within the second predetermined significance range, is met comprises applying a Kolmogorov-Smirnov test.

A Kolmogorov-Smirnov test provides a way of comparing distributions without prior assumptions about the shape of the distributions, meaning that the technique is generally applicable to different models.

Optionally, the method further comprises determining whether (2) the obtained p-values for sample subsets of the real dataset fall within a first predetermined significance range, and the model is determined to be accurate if conditions (1) and (2) are met.

Optionally, determining whether condition (2), the obtained p-values for sample subsets of the real dataset fall within the first predetermined significance range, is met comprises determining whether a minimum, an average, or a maximum of the obtained p-values for sample subsets of the real dataset falls within the first predetermined significance range.

Optionally, the method comprises iteratively generating and testing a plurality of models to find a model that is determined to be accurate. This provides a way of automatically learning a model for a large data set with increased confidence.

Optionally, an accuracy parameter for each tested model is calculated based on the obtained p-values for sample subsets of the real dataset and/or based on the distribution difference characteristic, and models are iteratively generated by varying the parametric relationship according to a gradient of the accuracy parameter.

Optionally, the multivariate data are transactions in a payment authorisation network comprising a plurality of points of sale, POS, the plurality of channels for each transaction includes a state of the POS which handled the transaction, and the model indicates a parametric relationship between the state of the POS and one or more other channels of the plurality of channels, and the method further comprises, after determining an accurate model, predicting a transaction behaviour at a first POS using the accurate model and a state of the first POS. By predicting transaction behaviour, conditions in the payment authorisation network can be optimised for the predicted behaviour.

Optionally, the method further comprises displaying the predicted transaction behaviour in a display. By displaying the prediction in a display, a user can be guided in technical management of the payment authorisation network as a whole or of a local part of the payment authorisation network.

Optionally, the method further comprises allocating a network resource based on the predicted transaction behaviour. In this way, the payment authorisation network can be configured to improve speed, improve resource efficiency or improve security based on predicted transaction behaviour.

According to a second aspect, the present disclosure provides a computer system for testing a model indicating a parametric relationship between a plurality of channels of multivariate data, the computer system comprising: a memory configured to store a model indicating a parametric relationship between a plurality of channels of multivariate data and a real dataset of observed multivariate data comprising the plurality of channels; a control dataset generator configured to generate a control dataset of multivariate data comprising the plurality of channels, the control dataset being generated based on the model; a p-value calculator configured to, for each of a plurality of sample subsets from the real dataset and the control dataset, calculate a p-value for the model; and a model accuracy determiner configured to determine whether (1) a distribution difference characteristic of a distribution of the obtained p-values for sample subsets of the real dataset and a distribution of the obtained p-values for sample subsets of the control dataset falls within a second predetermined significance range, and, if condition (1) is met, determine that the model is accurate, wherein the control dataset generator, the p-value calculator and the model accuracy determiner are implemented by one or more processors.

Optionally, the computer system further comprises a model generator configured to generate the model, wherein the computer system is configured to iteratively generate and test a plurality of models to find a model that is determined to be accurate, wherein the model generator is implemented by the one or more processors.

Optionally, the computer system further comprises a prediction generator configured to generate and output a prediction based on the model that is determined to be accurate, wherein the prediction generator is implemented by the one or more processors.

According to a third aspect, the present disclosure provides a computer-implemented payment authorisation network comprising: a plurality of points of sale, POS, configured to handle payment transactions; a payment network configured to communicate with the plurality of POS; and a computer system as described above, wherein the real dataset of observed multivariate data comprises multivariate data about each transaction, the multivariate data comprising a plurality of channels including a state of the POS handling the payment transaction.

Optionally, the computer system is configured to provide a model that is determined to be accurate to the payment network, or is configured to provide a prediction based on the model to the payment network; and the payment network is configured to allocate a network resource based on the model or the prediction.

According to a fourth aspect, the present disclosure provides a computer-readable storage medium comprising instructions which, when executed by a computer system comprising at least one processor, cause the computer system to: obtain a real dataset of observed multivariate data comprising a plurality of channels; generate a control dataset of multivariate data comprising the plurality of channels, the control dataset being generated based on the model; for each of a plurality of sample subsets from the real dataset and the control dataset, calculate a p-value for a model indicating a parametric relationship between the plurality of channels; and determine whether (1) a distribution difference characteristic of a distribution of the obtained p-values for sample subsets of the real dataset and a distribution of the obtained p-values for sample subsets of the control dataset falls within a second predetermined significance range, and, if condition (1) is met, determine that the model is accurate.

BRIEF DESCRIPTION OF THE DRAWINGS

FIG. 5 is a flow chart schematically illustrating a computer-implemented method for testing a model indicating a parametric relationship between a plurality of channels of multivariate data;

DETAILED DESCRIPTION

Figure 1A:
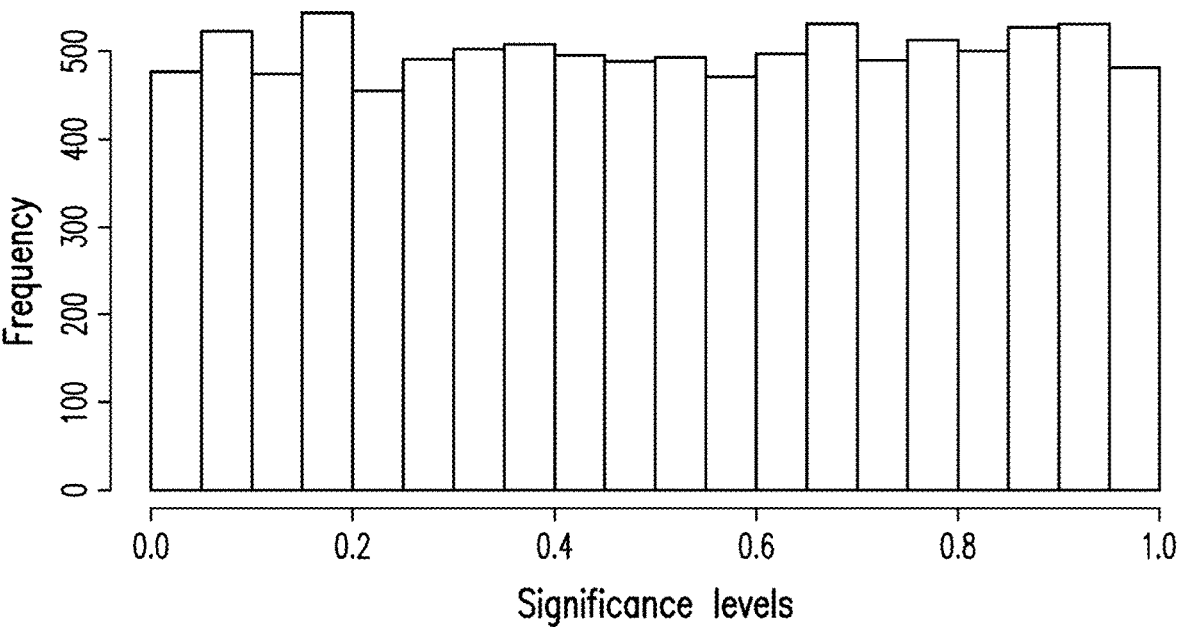
FIGS. 1A and 1B are graphs illustrating distributions of p-values in example scenarios illustrating the multiple comparisons problem in prior art methods.
Figure 1B:
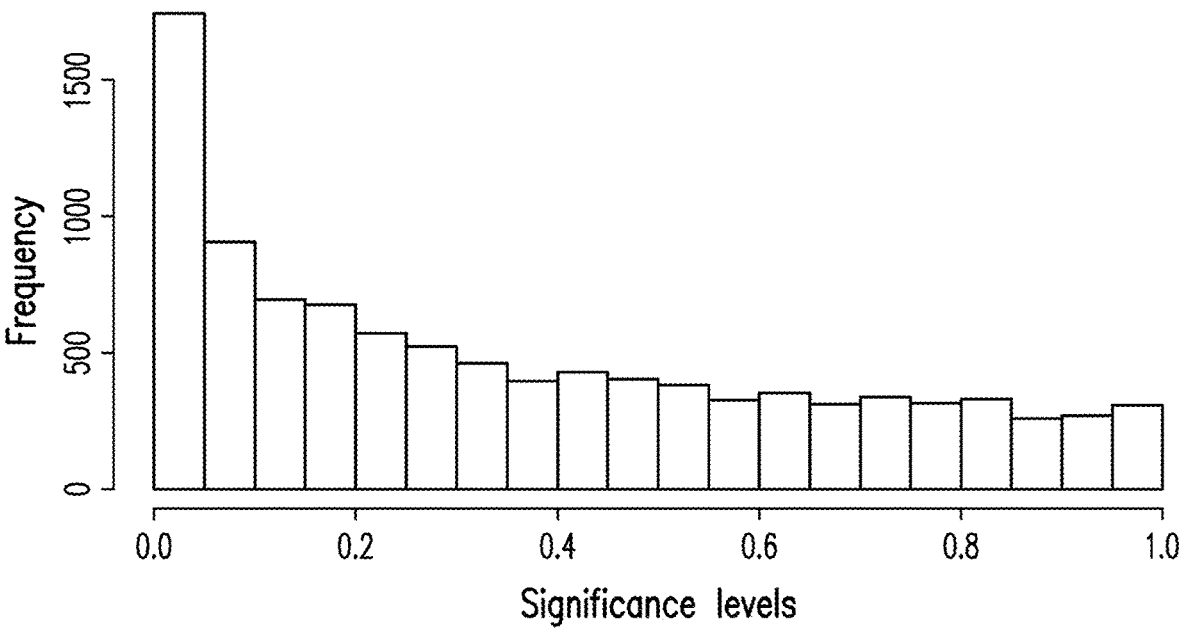
Figure 2A:
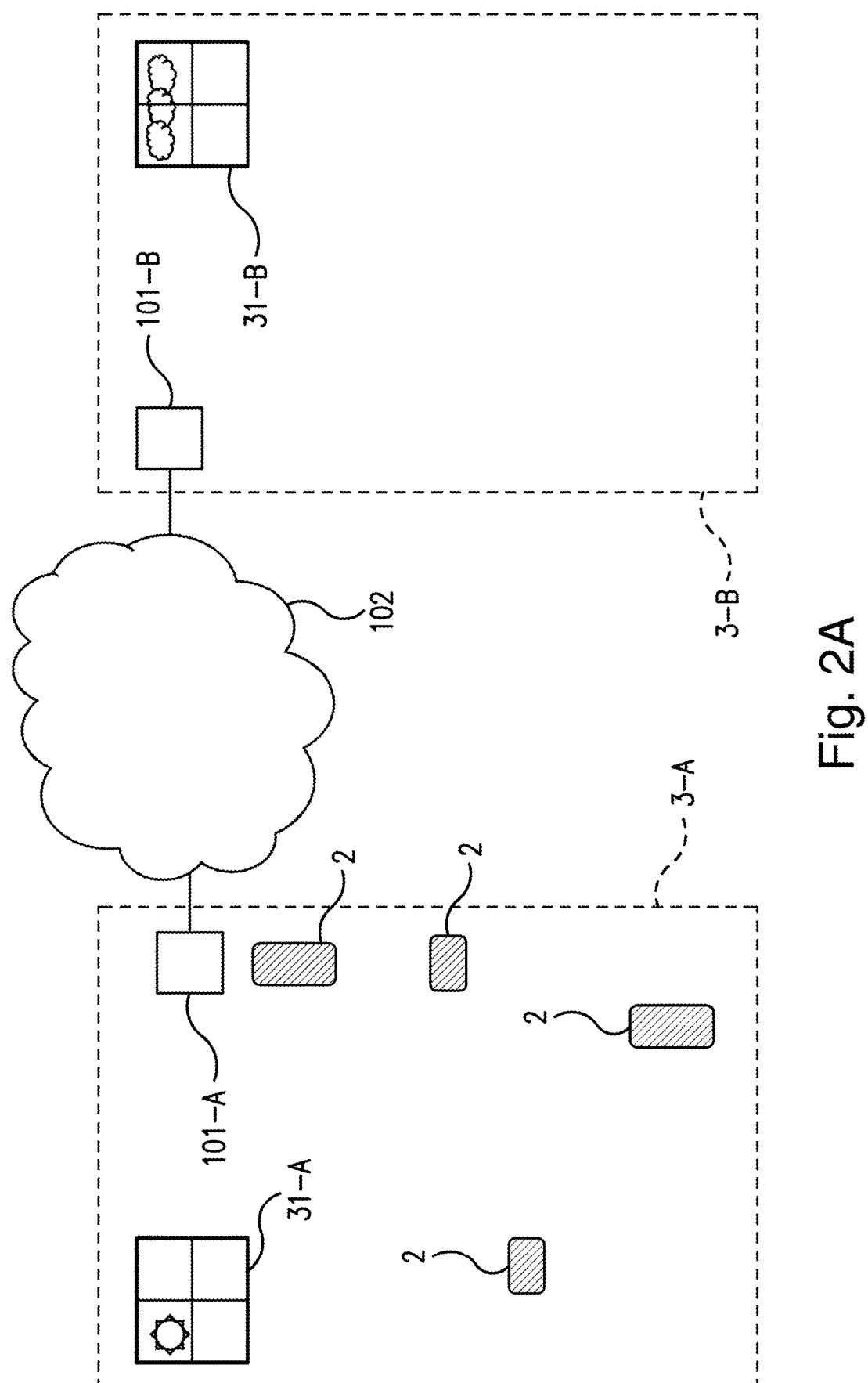
FIGS. 2A and 2B are block diagrams schematically illustrating a payment authorisation network.
Figure 2B:
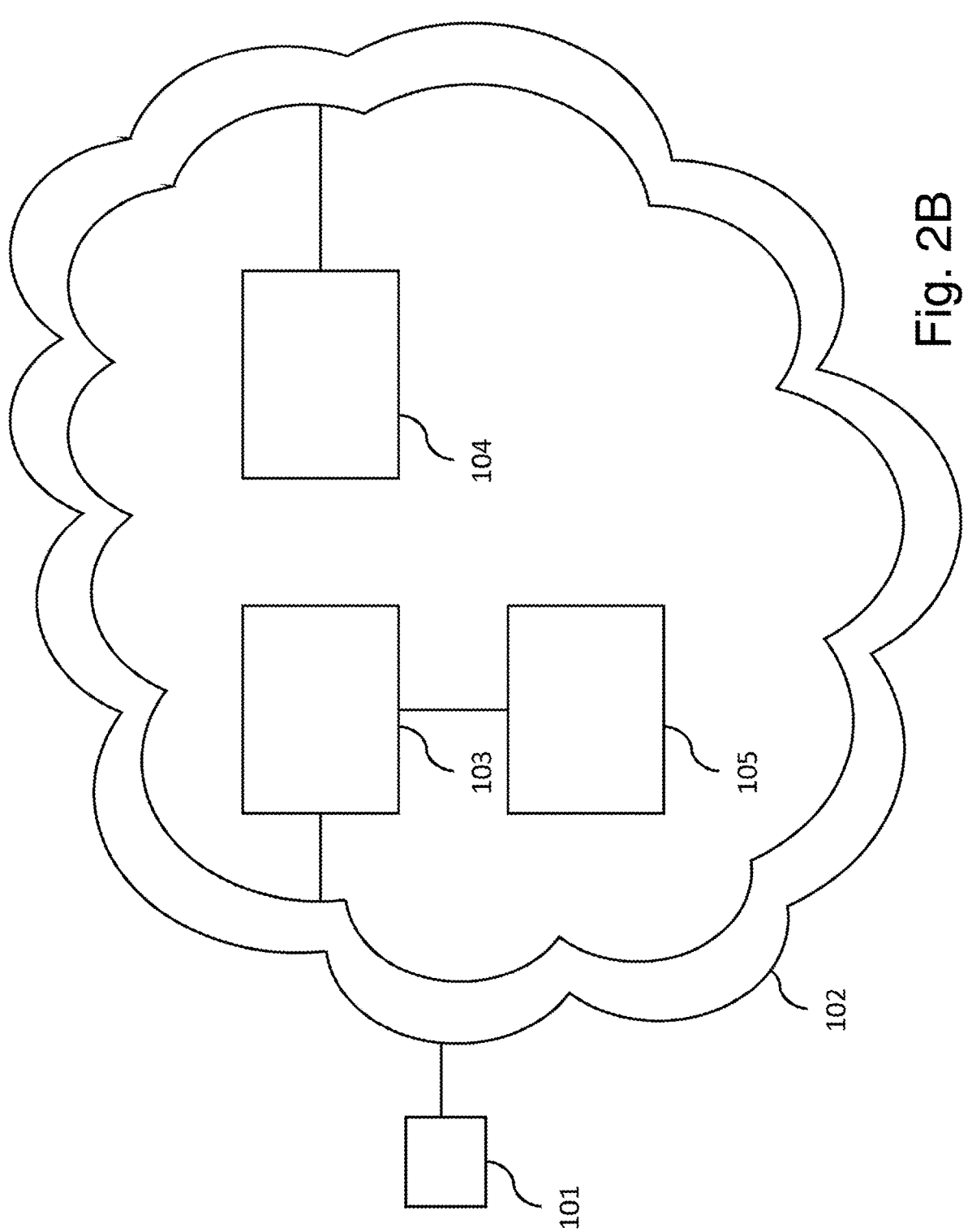

FIGS. 2A and 2B are block diagrams schematically illustrating a payment authorisation network.

As shown in FIG. 2A, the payment authorisation network comprises plurality of points of sale (POS) 101, of which two POSs 101-A and 101-B are illustrated, and a network 102 to which each of POS is connected.

The POSs 101-A and 101-B are located in different locations 3-A and 3-B. Each of the locations 3 may be, for example, a fixed payment location such as a retail shop or a restaurant, or a mobile payment location such as a delivery service. As shown in FIG. 2A, location 3-A has a plurality of customers 2 waiting to conduct a transaction at the point of sale 101-A. On the other hand, location 3-B has no customers 2.

Additionally, each POS 101-A, 101-B has an associated state 31-A, 31-B which may include factors such as a current time, a geographical location, a weather status, and a type of business associated with the POS.

FIG. 2B illustrates features of the payment authorisation network 102 to which each POS 101 is connected.

The payment authorisation network 102 connects each POS 101 to a transaction server 103, and connects the transaction server 103 to a financial server 104. Each of the transaction server 103 and the financial server 104 may instead be a group of servers. The servers may be collected together or provided as a distributed server arrangement.

The POS 101 and transaction server 103 act as intermediaries for a financial transaction between a customer 2 and another party to the transaction (e.g. a business located at location 3-A). Specifically, the customer 2 uses an identifier (such as a payment card or a mobile phone supporting financial transaction) at the POS 101 to request the financial transaction, the transaction server 103 verifies the parties to the transaction and communicates with one or more financial servers 104 associated with financial institutions used by the parties to the transaction, in order to complete the financial transaction.

The point of sale 101 and the transaction server 103 aim to provide an impartial and universal intermediary between the parties and financial institutions involved in the transaction, to improve security and convenience for financial transactions between any pair of parties.

A transaction server 103 typically participates in large numbers of transactions involving different points of sale 101 and different financial servers 104. Each transaction requires network resources such as bandwidth and processing time for communicating between the POS 101, the transaction server 103 and the financial server 104, for verifying the parties to the transaction and for completing the financial transaction. These network resources will in general not be uniformly required throughout the payment transaction network. For example, in FIG. 2A, the location 3-A currently has a queue of customers 2 while the location 3-B has no customers. If resources are allocated equally to POSs 101-A and 101-B, then transactions at location 3-A will be slowed by limited network resources, and the network resources allocated to location 3-B will be wasted. As a result, it is desirable to allocate network resources according to identified requirements at different POSs.

In order to identify network resource requirements, a modelling system 105 is provided in the payment authorisation network. The modelling system 105 may conveniently be connected to or integrated in the transaction server 103, in order to obtain data for modelling a transaction behaviour in the payment authorisation network.

Figure 3:
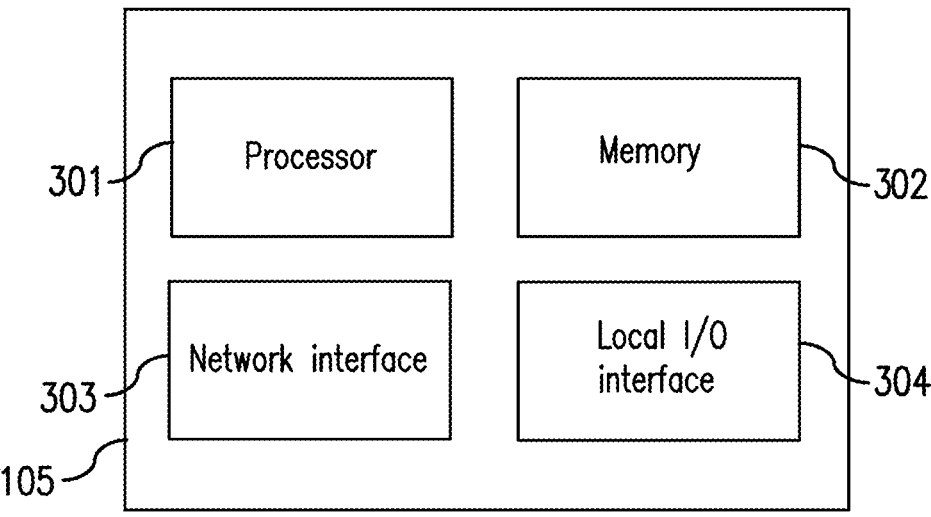
FIG. 3 is a block diagram schematically illustrating a processing device on which a modelling system could be implemented.

FIG. 3 is a block diagram schematically illustrating a processing device on which a modelling system 105 could be implemented. In FIG. 3, the processing device is a general purpose device comprising one or more processors 301 configured to execute instructions defining a software-based modelling system 105. In addition to a general-purpose processor, "processor" as defined herein includes specialised hardware comprising one or more circuits hard-coded to implement a function of the modelling system 105, such as application-specific integrated chips (ASICs).

Additionally, the processing device comprises one or more volatile or non-volatile memories 302 storing data to be processed by the processor. Additionally, in the case that the modelling system 105 is software-based, the one or more memories 302 may store one or more scripts or blocks of compiled code defining the modelling system 105. Scripts or compiled code defining the modelling systems 105 described in the application may be stored on a non-transitory computer-readable medium such as a flash memory or a CD drive, and may be transmitted as a communication signal, in order to distribute a copy of the modelling system 105 for use on a processing device.

Further core, the processing device comprises a network interface 303 for communicating with the payment authorisation network 102. The processing device may communicate with the payment authorisation network 102 to obtain data about one or more transactions occurring via the payment authorisation network 102 and optionally to output one or more results generated by the modelling system 105 (as explained below). The network interface 303 may, for example, take the form of a wired communication interface such as Ethernet or a wireless communication interface such as WiFi. In some embodiments, the modelling system can be implemented in isolation without a direct connection to the payment authorisation network 102; in such cases, the modelling system cannot directly affect the payment authorisation network 102 and only processes data explicitly provided thereto to test or generate a model.

Optionally, the processing device comprises a local I/O interface 304 for a user to provide inputs (via a keyboard, touch screen, flash memory drive, CD etc.) and/or for a user to obtain outputs (via a screen, speaker, flash memory drive, CD etc.). Local inputs may include one or more models to be tested, one or more model generation variables, one or more control dataset generation variables, and one or more real datasets for modelling. Local outputs may include an outcome of testing a model, a generated model, a prediction based on a generated model, and/or a network instruction based on a prediction.

Figure 4:
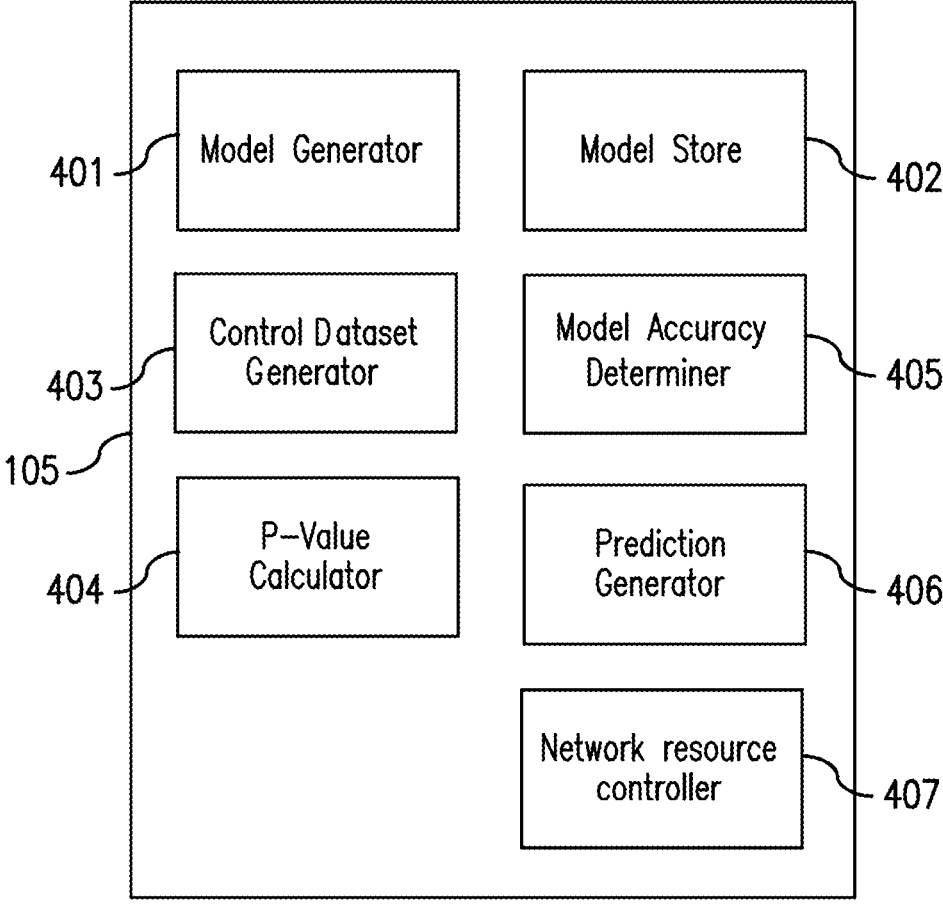
FIG. 4 is a block diagram schematically illustrating the modelling system as functional blocks.

FIG. 4 is a block diagram schematically illustrating the modelling system 105 as functional blocks. Each block may represent a process to be executed on a processor 301 or in dedicated circuitry. Each block may also correspond to a script or compiled code stored in a memory 302.

Referring to FIGS. 4 and 5, a core functionality of the modelling system 105 is testing models. In a simple case, the modelling system comprises a model store 402 storing a model that is hypothesised to match a real dataset of transactions via the payment authorisation network 102. More specifically, the model is a parametric relationship between a plurality of channels of multivariate data that is hypothesised to be consistent with the transactions. The multivariate data may, for example, include a state 31-A of a POS 101-A that participates in the transaction.

As mentioned above, this state may include factors such as a current time, a geographical location, a weather status, and a type of business associated with the POS. Furthermore, the multivariate data may include transaction instance information such as a value of the transaction or a financial institution participating in the transaction. Each channel may comprise a continuous variable such as time, or a discrete value such as one of a plurality of enumerated types of business.

Preferably, the model indicates a parametric relationship between a state channel associated with the POS and one or more other channels. This enables modelling how conditions for the POS affect transaction patterns, and thereby enables making predictions for transaction patterns at a specific POS.

The modelling system is preferably configured to treat ordered variables (where a sequence of possible values of the variable has meaningful order (e.g. value of the transaction)) and unordered variables (where different enumerated values have no meaningful order (e.g. enumerated types of business)) differently, avoiding identifying correlations along a range of values of an unordered variable.

One very simple example of a parametric relationship between channels could, for example, be identifying that an average time between sales at a business associated with an "ice cream" type is lower when a weather status is "sunny" than when the weather status is "snowing".

At step S502, the model store 402 obtains the model. The model may be a predetermined model, may be input by a user or from a storage device via local I/O interface 304 or input via network interface 303, or may be obtained from a model generator 401 (this last option is discussed below with reference to FIG. 6).

At step S504, the modelling system 105 obtains a real dataset of observed multivariate data comprising the plurality of channels. In this example, each multivariate datum represents a transaction.

At step S506, a control dataset generator 403 is configured to generate a control dataset for comparison to the real dataset when testing the model. The control dataset is generated based on the model that is to be tested, such that a comparison between the control dataset and the real dataset is a comparison between control sample data known to be generated according to the model against real sample data which may have been generated according to the model. The control dataset preferably has a same or similar size to the real dataset.

At step S508, a p-value calculator 204 is configured to, for each of a plurality of sample subsets from the real dataset and the control dataset, calculate a probability (p-value) that the sample subset is taken from a set that follows the model. Although it is known that the control dataset is generated according to the model and therefore p-values for sample subsets from the control dataset might be expected to be high, at least the sampling in step S508 is random, such that some samples from the control dataset may not be obviously consistent with the model and the corresponding p-values will be low. The p-values generated at step S508 are stored in a memory 302 and each p-value is associated with the real dataset or the control dataset, providing a distribution of p-values for the real dataset and a distribution of p-values for the control dataset.

At step S510, a model accuracy determiner 405 performs the optional step of determining whether the obtained p-values for sample subsets of the real dataset fall within a first predetermined significance range (i.e. there are no samples which provide statistically significant evidence for the alternative hypothesis that the model is incorrect/inaccurate).

For example, the first predetermined significance range may be (p>5%). This is a traditional significance test for comparing the real dataset to the model, and may be used as a first pass to identify when a model is clearly inconsistent with the real dataset. Step S510 may be performed in parallel with step S508, before p-values are calculated for sample subsets of the control dataset, in order to save processing time in cases where the model is clearly inconsistent with the real dataset. In the case that the outcome of step S510 is NO, then the modelling system 105 performs step S516, determining that the tested model is not accurate, and, in the case that step S508 is performed in parallel, p-values are not calculated for the control dataset. Otherwise, the modelling system 105 continues to step S512.

At step S512, the model accuracy determiner 405 compares the distributions of obtained p-values for sample subsets of the real dataset and for sample subsets of the control dataset, and determines whether a characteristic difference between the distributions falls within a second predetermined significance range.

For example, the characteristic difference may be a difference in the mean p-value, or variance of p-values, of the two distributions. The second predetermined significance range may, for example, be a difference of means lower than 2% or a ratio of variances that falls within the range 0.95 to 1.05.

Preferably, however, the characteristic difference is the result of a Kolmogorov-Smirnov test. Specifically, the Kolmogorov-Smirnov test can be implemented to identify an upper limit (formally supremum) for the difference between two cumulative distribution functions. In the case of the present application, the two cumulative distribution functions are formed by summing the distributions of p-values for sample subsets of the real dataset and for sample subsets of the control dataset. A Kolmogorov-Smirnov test provides a generalised way to compare two sample distributions and establish a likelihood that the two samples come from a common underlying distribution (i.e. are derived from the same model), meaning that it can be used regardless of the specifics of the model being tested. Additionally, the sensitivity of a Kolmogorov-Smirnov test can be adapted according to sample size.

If, at step S512, the outcome is YES, then the modelling system 105 proceeds to step S514 and determines that the model is accurate. In this context, what is meant by an accurate model is defined by the first and second predetermined significance ranges, which can be adapted in order to tighten or loosen the requirements for a model to be considered as accurately modelling the real dataset.

In the above example described with reference to FIG. 5, the modelling system 105 only tests a model and provides an accuracy of the model as an output. As a result, in this simple example, the model generator 401, prediction generator 406 and network resource controller 407 shown in FIG. 4 may be omitted. On the other hand, optional extended functionalities for the modelling system 105 will now be described with reference to FIGS. 6 to 8.

Figure 6:
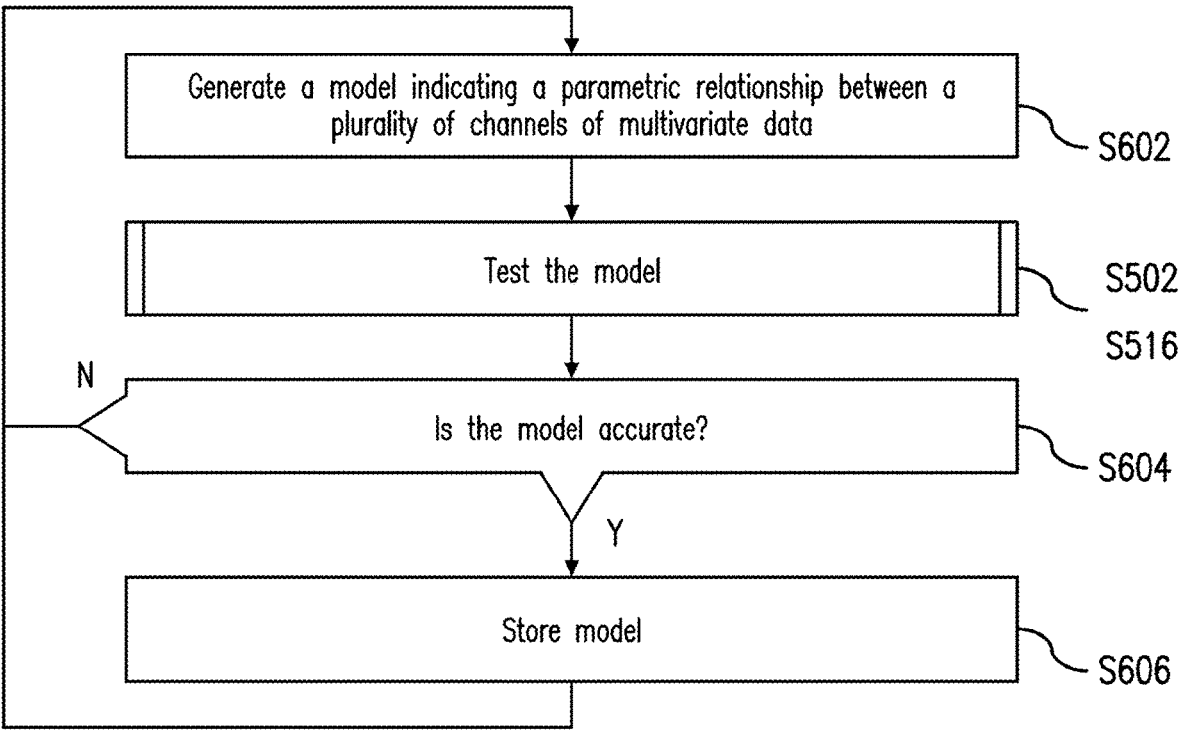
FIG. 6 is a flow chart schematically illustrating a computer-implemented method for generating an accurate model for a parametric relationship between a plurality of channels of multivariate data.

FIG. 6 is a flow chart schematically illustrating a computer-implemented method for generating an accurate model for a parametric relationship between a plurality of channels of multivariate data.

Referring to FIG. 6, at step S602, a model generator 401 included in an embodiment of modelling system 105 generates a model indicating a parametric relationship between a plurality of channels of multivariate data.

As shown in FIG. 6, step S602 is in a loop and is performed multiple times. The first time step S602 is performed, the parametric relationship be made up of predetermined values. Subsequent iterations of step S602 are discussed below.

At steps S502-S516, the model generated in step S602 is tested according to the procedure described above with reference to FIG. 5.

At step S604, an outcome of testing the generated model in steps S502-S516 is examined to determine whether the generated model is accurate. If the generated model is not accurate, then the iteration of the loop is complete. On the other hand, if the generated model is accurate, then the generated model is stored in model store 402.

When an iteration of the steps in FIG. 6 is complete, the procedure may loop back to step S602 to generate another model to be tested. There are many ways in which further models could be generated.

In a simple case, the model store 402 stores a set of predetermined models, and each iteration of generating a model comprises selecting one of the stored models. Alternatively, a next model may be generated by varying the parameters of the parametric model used in a previous iteration of the loop of FIG. 6.

The selection or variation to generate the next model may be random, but is preferably guided by one or more previous outcomes of testing models. For example, the modelling system 105 may be configured to explore an n-dimensional space from which model parameters are selected. A next model may be generated by selection or variation on the basis that it is at least a minimum distance from the previous model in the n-dimensional space. Furthermore, the next model may be generated to be closer to the previous model in the case that the previous model was found to be accurate and to be further from the previous model in the case that the previous model was found to be inaccurate.

Furthermore, the outcome of testing (FIG. 5) may be used in more detail. Rather than simply using the evaluation of accurate or not accurate, the distribution difference characteristic determined in step S512, and/or the p-values calculated in step S508, may be used to define an accurateness parameter. The accurateness parameter may, for example, be equal to the distribution difference characteristic. By testing multiple models, a gradient of the accurateness parameter may be established and this may be used to more efficiently explore the space of possible parametric models by exploring relatively different models when the accurateness gradient is small and exploring relatively similar models when the accurateness gradient is large.

In the case where a generated model was selected from the model store 402, the generated model may optionally be deleted from model store 402 in the case that it is determined to be inaccurate. Alternatively; inaccurate models may be stored regardless, and labelled as inaccurate models (e.g. using a data flag). Similarly, accurate models stored in model store 402 may be labelled as accurate. Retaining inaccurate models may assist in attempting to generate an accurate model.

In one example, the modelling system 105 may be configured to repeat the loop of FIG. 6 until an accurate model is stored in step S606, and then to stop having succeeded in identifying an accurate model.

However, there may be more than one accurate model for a real dataset. For example, one model could reflect correlation between first and second channels of the multivariate data, while another model reflects correlation between third and fourth channels of the multivariate data. Accordingly, in another example, the modelling system 105 may be configured to keep looping through the method of FIG. 6 until it is told to stop or it has evaluated the accuracy of all potentially-accurate models.

Furthermore, more complex machine learning techniques, such as a generative classifier implemented in a neural network, may be used to iteratively generate an increasingly accurate model by testing models using the method of FIG. 5.

After the modelling system 105 has identified an accurate model, the model may then be used for a variety of purposes, as described below.

Figure 7:
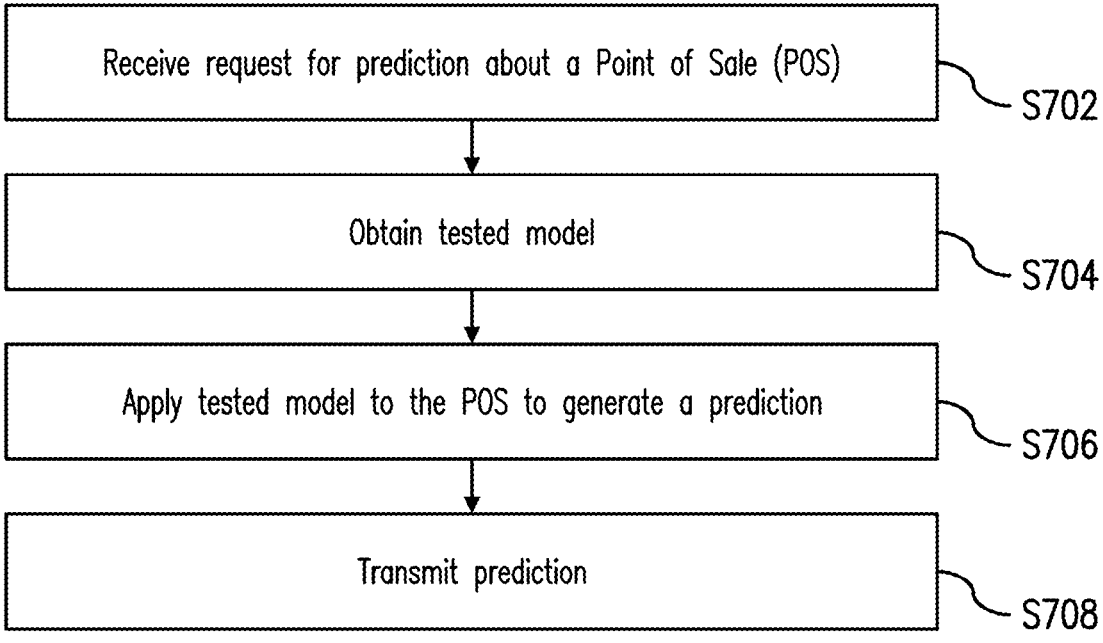
FIG. 7 is a flow chart schematically illustrating a computer-implemented method for predicting a transaction behaviour at a point of sale.

FIG. 7 is a flow chart schematically illustrating a computer-implemented method for predicting a transaction behaviour at a point of sale.

At step S702, the modelling system 105 receives a request for a prediction about a point of sale (POS) 101. The request comprises information about a current or future state of the POS 101, such as a geographical location and a type of business associated with the POS 101. The request may, for example, be generated at the POS 101 using a user interface. Alternatively, the request may, for example, be provided using a web interface of a website served via the network interface 303.

At step S704, the prediction generator 406 included in this embodiment of the modelling system 105 obtains a model from model store 402 which has been tested and been determined to be accurate.

At step S706, the modelling system 105 applies the model to the POS 101 to generate a prediction. For example, the modelling system 105 uses the state information provided about the POS as an input to the parametric model, and generates a prediction as a function of the parametric model. The prediction may, for example, an estimated transaction pattern at the POS for the next week.

At step S708, prediction is transmitted to the source of the request. If the source of the request was the POS 101, the prediction may be displayed on a screen of the POS 101 or otherwise output.

As a variation on the method of FIG. 7, the prediction generator 406 may be implemented outside of the modelling system 105, for example on the POS 101. A copy of the accurate model determined using one of the above-described methods may be distributed through a payment authorisation network for use in predicting transaction behaviours. For example, when located in the POS 101, the prediction generator 406 can use the model to make a series of predictions for a local user of the POS 101 (e.g. a business owner). This may assist the local user in making decisions about transactions in their location 3. For example, the local user may see that they need will a second POS 101 at their location to provide the technical infrastructure for handling a predicted increase in transactions.

Figure 8:
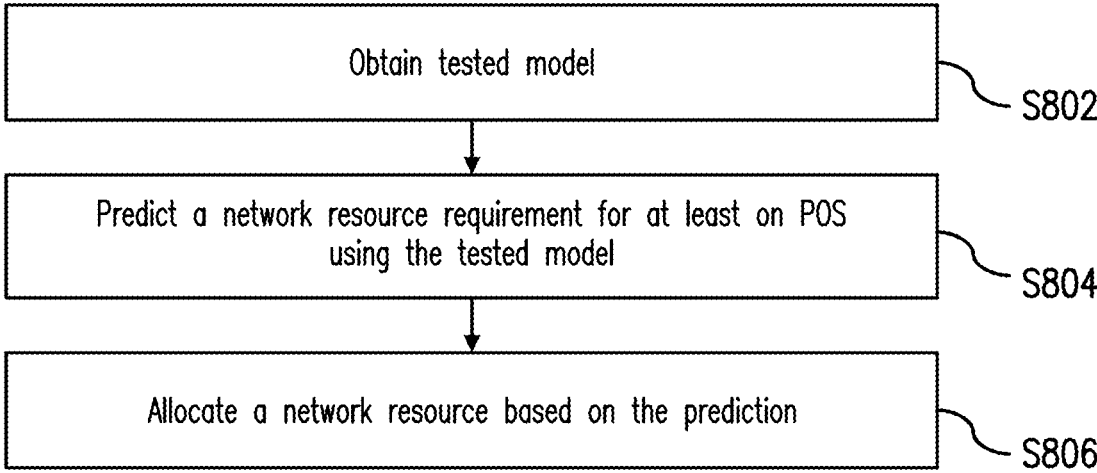
FIG. 8 is a flow chart schematically illustrating a computer-implemented method for managing a network resource in a payment authorisation network.

FIG. 8 is a flow chart schematically illustrating a computer-implemented method for managing a network resource in a payment authorisation network. This is an alternative use for the identified accurate model. The method of FIG. 8 may be implemented at, for example, the modelling system 105, the transaction server 103, a financial server 104, or a network manager for the transaction authorisation network 102.

Referring to FIG. 8, at step S802, a tested, accurate model is obtained from the modelling system 105.

Then, at step S804, a network resource requirement for at least one POS is predicted using the model. The network resource requirement may for example be an optimal bandwidth or processing capacity for handling an expected transaction frequency at the POS.

Then, at step S806, a network resource is allocated based on the prediction. For example, if it is predicted that the POS will require more resources than are currently allocated in order to perform its expected transaction pattern with acceptable processing times, then an additional network resource may be allocated. On the other hand, if currently allocated resources appear excessive based on the prediction, then a network resource may be deallocated.

In one example, the network resource requirement may be predicted for all POSs which share a given payment authorisation network, so that available network resources can be shared and prioritised according to the requirement of each POS.

Although the following example relates specifically to transactions in a payment authorisation network, the statistical concepts described in the application are applicable for modelling any multivariate data. For example, the described techniques could be applied generally to any use of a computer network, or to modelling behaviour in other networks such as blood vessel networks (e.g. in brain scanning).

In one case, the modelling system 105 may be designed with a general purpose function independent of any underlying meaning to the channels of the multivariate data it models. Alternatively, the modelling system 105 may be configured with likely types of model for a given scenario, such that it is more likely to determine an accurate model.

In the above examples, modelling is performed based purely on a set of multivariate data. However, the modelling system 105 may additional use other data sources. For example, the modelling system 105 may also use data of a different form but associated with at least two of the channels of the multivariate data. As an example, in the specific case of modelling transactions via a payment authorisation network, the additional data may comprise taxation statistics such as tax return data associated with geographical locations and types of businesses. Such supplementary data sources may, for example, be used to establish an initial version of a model that is then refined based on the main set of multivariate data. As another example, external events, such as sports events or conventions in the vicinity of a POS can affect transaction patterns; effects of future events of a given type can be estimated based on a real dataset associated with a past such event.

The invention claimed is:

1. A computer-implemented method implemented with a processor and a memory, the method for testing an accurate model indicating a parametric relationship between a plurality of channels of multivariate data, the method comprising:

obtaining a real dataset of observed multivariate data comprising the plurality of channels;

generating a control dataset of multivariate data comprising the plurality of channels, the control dataset being generated based on the accurate model, wherein the control dataset of the multivariate data comprises transaction multivariate data about each transaction of a plurality of transactions performed with a plurality of points of sales (POSs) that each include a processor and a memory, the transaction multivariate data comprising a plurality of channels including a channel that indicates a state of a respective POS of the plurality of POSs handling a transaction of the plurality of transactions, wherein the accurate model indicates a parametric relationship between the state of the respective POS and one or more other channels of the plurality of channels;

for each of a first plurality of sample subsets from the real dataset and a second plurality of sample subsets from the control dataset, calculating a p-value;

generating a first distribution of the p-values of the first plurality of the sample subsets from the real dataset;

generating a second distribution of the p-values of the second plurality of the sample subsets from the control dataset;

determining whether (1) a distribution difference characteristic of the first distribution and the second distribution falls within a first predetermined significance range;

determining whether (2) the p-values for the first plurality of the sample subsets of the real dataset fall within a second predetermined significance range;

determining that the accurate model is accurate if condition (1) and condition (2) are met, and by iteratively generating and testing a plurality of models; and if the accurate model is determined to be accurate,
  predict, with the model, a transaction behaviour for a first POS of the plurality of POSs based on a state of the first POS, wherein the transaction behaviour includes a network resource requirement including one or more of a bandwidth or processing capacity of the first POS; and
  allocate the network resource requirement based on the accurate model predicting the network resource requirement.

2. A computer-implemented method according to claim 1, wherein:
  the transactions are performed in a payment authorisation network comprising the plurality POSs,
  the plurality of channels for each transaction includes a state of one POS from the plurality of POS at which the transaction occurred, and
  the model indicates a parametric relationship between the state of the one POS and one or more other channels of the plurality of channels.

3. A computer-implemented method according to claim 1, wherein the determining whether condition (1), the distribution difference characteristic of the first distribution and the second distribution falls within a first predetermined significance range, is met comprises applying a Kolmogorov-Smirnov test.

4. A computer-implemented method according to claim 1, wherein an accurateness parameter for each tested model of the plurality of models is calculated based on the obtained p-values for the first plurality of sample subsets of the real dataset and/or based on the distribution difference characteristic, and the plurality of models are iteratively generated by varying the parametric relationship according to a gradient of the accurateness parameter.

5. A computer-implemented method according to claim 1, the plurality of channels for each transaction includes a state of a respective POS of the plurality of POS which handled the transaction, and the model indicates a parametric relationship between the state of the respective POS and one or more other channels of the plurality of channels.

6. A computer-implemented method according to claim 5, further comprising displaying the predicted transaction behaviour in a display.

7. A computer system comprising:
  a memory configured to store an accurate model indicating a parametric relationship between a plurality of channels of multivariate data and a real dataset of observed multivariate data comprising the plurality of channels;
  a control dataset generator configured to generate a control dataset of multivariate data comprising the plurality of channels, the control dataset being generated based on the accurate model, wherein the control dataset of the multivariate data comprises transaction multivariate data about each transaction of a plurality of transactions performed with a plurality of points of sales (POSs) that each include a processor and a memory, the transaction multivariate data comprising the plurality of channels including a channel that indicates a state of a respective POS of the plurality of POSs handling a transaction of the plurality of transactions, wherein the accurate model indicates a parametric relationship between the state of the respective POS and one or more other channels of the plurality of channels;

a p-value calculator configured to, for each of a first plurality of sample subsets from the real dataset and a second plurality of sample subsets from the control dataset, calculate a p-value;

a model accurateness determiner configured to
  generate a first distribution of the p-values of the first plurality of the sample subsets from the real dataset,
  generate a second distribution of the p-values of the second plurality of the sample subsets from the control dataset,
  determine whether (1) a distribution difference characteristic of the first distribution and the second distribution falls within a first predetermined significance range,
  determine whether (2) the p-values for the first plurality of the sample subsets of the real dataset fall within a second predetermined significance range,
  determine that the accurate model is accurate if condition (1) and condition (2) are met, and by iteratively generating and testing a plurality of models;

a prediction generator configured to if the accurate model is determined to be accurate, predict, with the accurate model, a transaction behaviour for a first POS of the plurality of POSs based on a state of the first POS, wherein the transaction behaviour includes a network resource requirement including one or more of a bandwidth or processing capacity of the first POS; and wherein a computer-implemented payment authorisation network is configured to allocate the network resource requirement based on the accurate model predicting the network resource requirement, wherein the control dataset generator, the p-value calculator, the model accurateness determiner and the prediction generator are implemented by one or more processors.

8. A computer system according to claim 7, further comprising a model generator configured to generate the accurate model, wherein the model generator is implemented by the one or more processors.

9. A computer system according to claim 8, comprising the prediction generator.

10. The computer system of claim 7, wherein the computer-implemented payment authorisation network comprises
  the plurality of POSs configured to handle payment transactions;
  wherein the payment authorisation network is configured to communicate with the plurality of POSs;
  wherein the real dataset of observed multivariate data comprises multivariate data about each transaction, the multivariate data comprising a plurality of channels including a state of a respective POS of the plurality of POSs handling the payment transaction.

11. A computer-implemented payment authorisation network according to claim 10, wherein:
  the computer system is configured to provide the accurate model that is determined to be accurate to the payment authorisation network, or is configured to provide a prediction based on the accurate model to the payment authorisation network.

12. A non-transitory computer-readable storage medium comprising instructions which, when executed by a computer system comprising at least one processor, cause the computer system to:

obtain a real dataset of observed multivariate data comprising a plurality of channels of multivariate data;

generate a control dataset of multivariate data comprising the plurality of channels, the control dataset being generated based on an accurate model indicating a parametric relationship between the plurality of channels, wherein the control dataset of the multivariate data comprises transaction multivariate data about each transaction of a plurality of transactions performed with a plurality of points of sales (POSs) that each include a processor and a memory, the transaction multivariate data comprising the plurality of channels including a channel that indicates a state of a respective POS of the plurality of POSs handling a transaction of the plurality of transactions, wherein the accurate model indicates a parametric relationship between the state of the respective POS and one or more other channels of the plurality of channels;

for each of a first plurality of sample subsets from the real dataset and a second plurality of sample subsets from the control dataset, calculate a p-value indicating a parametric relationship between the plurality of channels;

generating a first distribution of the p-values of the first plurality of the sample subsets from the real dataset;

generating a second distribution of the p-values of the second plurality of the sample subsets from the control dataset;

determine whether (1) a distribution difference characteristic of the first distribution and the second distribution falls within a first predetermined significance range;

determine whether (2) the p-values for the first plurality of the sample subsets of the real dataset fall within a second predetermined significance range;

determining that the accurate model is accurate if condition (1) and condition (2) are met, and by iteratively generating and testing a plurality of models;

if the model is determined to be accurate, predict, with the model, a transaction behaviour for a first POS of the plurality of POSs based on a state of the first POS, wherein the transaction behaviour includes a network resource requirement including one or more of a bandwidth or processing capacity of the first POS, wherein a payment authorisation network is configured to allocate the network resource requirement based on the accurate model predicting the network resource requirement.

* * * * *